Dec. 6, 1966  J. DAUBENFELD  3,289,251
EXTRUDER (SCREW TYPE) FOR THE PROFILING OF PLASTIC MATERIALS
I.E., PLASTICS GETTERS, EARTHY MASSES, ETC.
Filed March 16, 1964
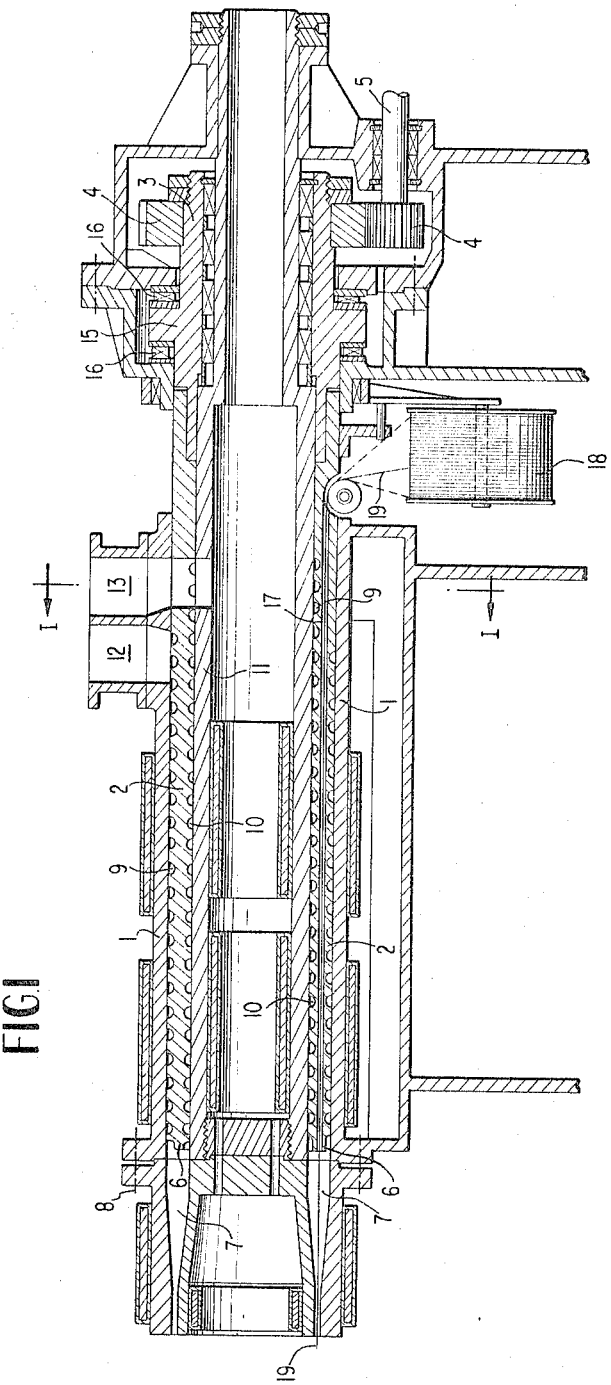
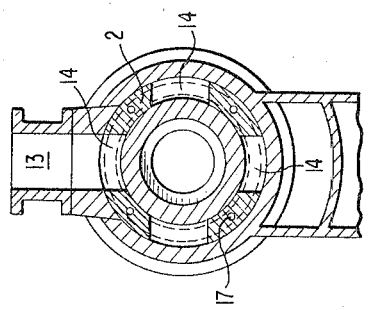
INVENTOR.
JEAN DAUBENFELD
BY Edwin Levisohn &
Henry R. Lerner
ATTORNEYS > # United States Patent Office > 3,289,251
> Patented Dec. 6, 1966

3,289,251
EXTRUDER (SCREW TYPE) FOR THE PROFILING OF PLASTIC MATERIALS I.E., PLASTICS GETTERS, EARTHY MASSES, ETC.
Jean Daubenfeld, Duren, Germany, assignor to Zimmermann & Jansen G.m.b.H., Duren, Rhineland, Germany, a corporation of Germany
Filed March 16, 1964, Ser. No. 385,091
4 Claims. (Cl. 18—13)

This invention relates to a screw type extruder for the profiling of plastic material, such as plastics, getters, earthy masses, etc.

Existing extruders consist normally of a screw rotating in a cylinder. Due to this design feature, the range of application of the cross-sections of the products to be extruded is limited. If products with larger cross-sections have to be extruded, special provisions have to be made to produce the pressure which is necessary for the physical properties of the products. If, for example, in a plain extruder a too high pressure has to be produced in order to reach the physical properties, the plastic mass would stream back or rotate itself with the screw without resulting in an output. If the cross-sections are too large, the respective extruder would not produce the pressure which is necessary for the physical properties of the products because the output is too small.

In order to overcome the disadvantages described above, it has been suggested to provide screws, one beside the other, with their threads geared. Even extruders with this design feature are not able to come up with the operational requirements. It is, however, possible to reach an output corresponding to the volume necessary for the respective cross-section, while providing the pressure necessary for the density of the product desired. The essential disadvantage of these extruders, however, consists in the use of at least two screws, by which the manufacturing costs are increased by a considerable amount. Furthermore, these extruders take considerable space which limits their application.

The known kinds of extruders have tools behind the worms, the first tool of which is used to compress the material coming out of the extruder. The following tools usually consist of a displacer, behind which a disintegrating tool is located. This means that the material coming out of the extruder is compressed to a single cord, which is pulled and partly disintegrated by the following tools. This again has the disadvantage that the cords which are disintegrated by the tool must be integrated again in such a manner that a homogeneous cord is produced. The formation of this homogeneous card therefore requires special deformation processes which again require additional operating force. Further, this deformation produces a pressure head due to friction which may change the physical properties considerably.

It is necessary in many cases to reinforce the extruded product which necessarily involves the placement of a wire or other filamentary reinforcement material interiorly of the extrusion. The known reinforcement means, while effecting a helical distribution of the reinforcement filament within the extruded mass, has no control over the transverse position of the reinforcement during extrusion, whereupon the reinforcement is randomly located near the outer peripheral surface of the extrusion if the extrusion is tubular in form or near the inner surface of the tube.

It is, therefore, a primary object of this invention to overcome these difficulties by placement of a form producing tool in direct attachment to the discharge end of the extruder.

It is a further object of this invention to provide an extruder employing a single, hollow worm screw to effect multiple plastic material extrusion paths in a highly simplified and low cost manner.

It is a further object of this invention to provide a plastic material extruder which includes a worm screw mounted for rotation about its axis having means to effect reinforcement of the extruded wherein the filamentary reinforcement is maintained at a desired constant radial position with respect to the extruded product.

Other objects of this invention and constructional features will be apparent from the following detailed description and the accompanying drawings, illustrating the best mode contemplated of bearing out the principle of the invention.

FIGURE 1 is a longitudinal section of the rotary cylindrical extruder according to the invention.

FIGURE 2 is a section taken about lines 1—1 of the extruder shown in FIGURE 1.

Referring to the drawings, there is provided within a cylindrical body 1 a hollow elongated worm 2 which is actuated via a driven end 3 whose spur gear means 4 and shaft 5 is driven by means (not shown). At the end 6 of worm 2, there is provided a pipe tool 7 which accomplishes the formation of the plastic extruded product. The forming tool 7 is shown in FIGURE 1 fixed and flanged to the cylindrical body 2 by means of joint 8 which can be loosened quite easily.

Worm 2 is provided with an external thread 9. It is within the meaning of this invention to provide a further thread 10 at the internal wall of worm 2. By means of external thread 9 and internal thread 10 of worm 2, it is possible to supply large quantities of plastic mass into the cavity of the forming tool 7 so that the capacity of the machine is increased by doubling the volume. Thus, by means of only one worm, an increased volume of plastic mass may be fed into the forming tool. Such volumes in the past can only be fed by processing machines having larger cross-sections.

Further reference to the drawings indicate that the invention includes multiple plastic material intakes at 12 and 13 which are spatially arranged in an axial direction, one after the other. By reference to FIGURE 2, it is obvious that worm 2 has in a circumferential direction, a number of openings which correspond to intakes 12, 13; in this way, it is possible that the plastic mass may be fed to the intakes 12 and 13 and uniformly distributed around the rotating worm 2. It is within the meaning of this invention to separate the intakes 12, 13 from each other such that selective feeding of separate materials is possible to the external thread 9 and the internal thread 10, respectively. Of course, once the materials reach the cavity within the forming tool 7, both these materials form various layers, one upon each other. In this way, for example, it is possible to feed through intake 12 into the extrusion path formed by external thread 9, a plastic mass, the hardness and elasticity of which are different from those values of the plastic mass being fed through intake 13 into the extrusion path formed by internal thread 10. When the materials reach the forming tool 7, both of these materials become a compact material which across its cross-section shows different properties. In this way, something can be manufactured having an outer layer of soft material and an inner layer of hard material.

The subject of this invention is not altered due to the fact that the properties and materials may be different. The application of different materials is simply exemplary of one application of the present extruder. The arrangement of the forming tool 7 at the immediate end 6 of the worm press allows the plastic material to be formed having a tubualr cross-section. A temporary shaping of the plastic mass supplied by the worm press which forms a solid material from which the tubular shaped parts are cut is no longer necessary. Obviously, the material coming out of worm 2, which is formed with a tubular cross-section, may be converted to plate shape by dividing the cross-sectional shape once or more than once. With the present machine, it is possible then, for example, to manufacture, in a continuous procedure, four plates of a different number of materials. These four plates may even consist of different materials which means that one of the layers could be of a material having an extremely good wear resistance as the lower layer could be made of a cheap filler material made from waste products as, for example, getters which is a waste product of no value when manufacturing paper. The machine as per this invention easily allows the manufacture of finished parts as they are used for prefabricated construction, as for example, window frames, doors, walls, etc.

The invention further includes the advantage of easily dismantling a worm 2. The worm 2 is provided with the external thread 9 and the internal thread 10 together with its actuator elements in the form of gear members 4 and shaft 5. For this purpose, the driven end 3 is provided with a collar 15. Both the collar 15 and the driven end 13, which is connected to worm 2, lean against the thrust bearings 16 at both sides. In this way, the axial thrust coming about an opposed axial direction due to the shape of the forming tool 7 are neutralized. These thrust bearings take up all the loads coming about in an axial direction caused by operation of worm 2. All stresses coming about in connection with the forming tool 7 due to the external and internal threads 9 and 10 are effected in opposed axial directions. The mass pressure produced in forming tool 7 acts as back pressure on the front face of worm 2. This mass pressure is absorbed by the thrust bearing 16. The thrust effect is much lower compared with results known from conventional designs of screw type extruders and consequently, an extended lifetime of the thrust bearings may be expected.

The primary feature of this invention is the provision of one or more axial bores 17 within worm 2. There is further provided a reel 18 which is fixed to the worm screw 2 such that the support for the reel 18 must, of necessity, rotate with screw 2 about the axis of the extruder assembly. Each reel 18 carries a continuous reinforcement filament, such as wire or glass thread, etc., at 19 which is fed into the axial bore 17. The plastic mass which is advancing in straight line fashion through the forming tool 7 causes the reinforcement filament 19 to move through the bores 17 and to effect spiral-type armory within the plastic mass which is being extruded. The reinforcement filament 19 passes over a freely revolvable guide as it is being let off of the spool radially providing a low friction method of effecting reinforcement insertion within the extrusion. While a single reel 18 is shown, it is apparent from viewing FIGURE 2 that in actuality four separate wires 19 pass through the spaced longitudinally extending holes 17 requiring, in this case, four separate reels. It is further obvious from viewing FIGURE 2 that the axially extending hole is located radially with respect to the hollow screw intermediate of its peripheral surfaces such that the reinforcement filament is maintained at a predetermined central position within the extruded filament ensuring maximum strength to the extrusion, as well as continuity to the finished product.

In operation, as drive shaft 5 rotates, it effects rotation of screw member 2 about its axis between the fixed inner and outer cylindrical members 1 and 11, respectively, whereby as a result of the supply of plastic material at inlets 12 and 13, respectively, the plastic material is forced forwardly by the screw means into the forming chamber of tool member 7. As the hollow screw 2 rotates and carries one or more wire spools 18 in a circular path, each reinforcement filament 19 is moved forwardly and deposited in a helical manner within the extrusion to form a reinformed extruded cylinder. Further, the reinforcement filament 19 is uniformly presented to the extrusion by being located in the embodiment shown intermediate to the inner and outer extrusion path.

While the invention has been particularly shown and described with reference to a preferred embodiment thereof, it will be understood by those skilled in the art that the forgoing and other changes in the form and details may be made therein without departing from the spirit and the scope of the invention.

What is claimed is:

1. An extruder comprising: a worm screw having a threaded surface and mounted for rotation about its axis, stationary guide means overlying said threaded surface and forming an extrusion path, means for supplying plastic material to said extrusion path for delivery to the extruder discharge opening, means for rotating said worm screw, at least one axially extending hole formed in said screw member terminating at the discharge end thereof and in line with the extruder discharge opening, and reinforcement filament supply means including a continuous reinforcement filament within said hole whereby as plastic material is extruded through said discharge opening said continuous reinforcement filament is drawn from said supply means and embedded within said extrusion at a constant predetermined radial position.

2. The extruder as claimed in claim 1 wherein said worm screw comprises an elongated hollow cylinder including inner and outer threaded surfaces and said stationary guide means comprises first and second concentric cylinders acting to sandwich said hollow worm screw therebetween to thereby form spaced inner and outer extrusion paths.

3. The extruder as claimed in claim 2 wherein said means for supplying plastic material between said threaded worm screw surface and said stationary guide means comprises a pair of axially spaced, plastic material inlets and means for coupling respective inlets to said inner and outer extrusion paths.

4. The extruder as claimed in claim 1 wherein said stationary guide means includes a radial opening spaced rearwardly of said plastic supply means exposing said rotating worm screw, and means for mounting said reinforcement filament supply means on said rotating worm screw to facilitate low friction removal of said reinforcement filament from said supply means and passage through said radial opening and said axially extending hole.

References Cited by the Examiner

UNITED STATES PATENTS

| 2,183,959 | 12/1939 | Dunsheath. | |
| 2,653,351 | 9/1953 | Henning | 18—12 |
| 2,695,422 | 11/1954 | Gray | 18—12 X |
| 2,764,780 | 10/1956 | Reifenhauser | 18—12 |
| 2,800,683 | 6/1957 | Teichman | 18—13 |
| 2,810,424 | 10/1957 | Swartswelter et al. | 18—13 X |
| 2,887,721 | 5/1959 | Blanchi et al. | 18—13 X |
| 2,896,254 | 7/1959 | Braun. | |
| 2,933,762 | 4/1960 | Pumphrey | 18—13 |
| 2,948,922 | 8/1960 | Meskat et al. | 18—12 |
| 3,102,694 | 9/1963 | Frenkel | 18—12 X |

FOREIGN PATENTS 855,362 11/1960 Great Britain.

WILLIAM J. STEPHENSON, *Primary Examiner.*

J. SPENCER OVERHOLSER, *Examiner.*